3,491,164
PROCESS FOR IMPROVING BUTANE ISOMERIZA-
TION OUTPUT DURING PARTIAL SHUTDOWN
Edward T. Tregilgas, Palos Verdes Estates, Calif., assignor
to Atlantic Richfield Company, Philadelphia, Pa., a corporation of Pennsylvania
Filed May 29, 1968, Ser. No. 733,029
Int. Cl. C07c 5/28
U.S. Cl. 260—683.67           4 Claims

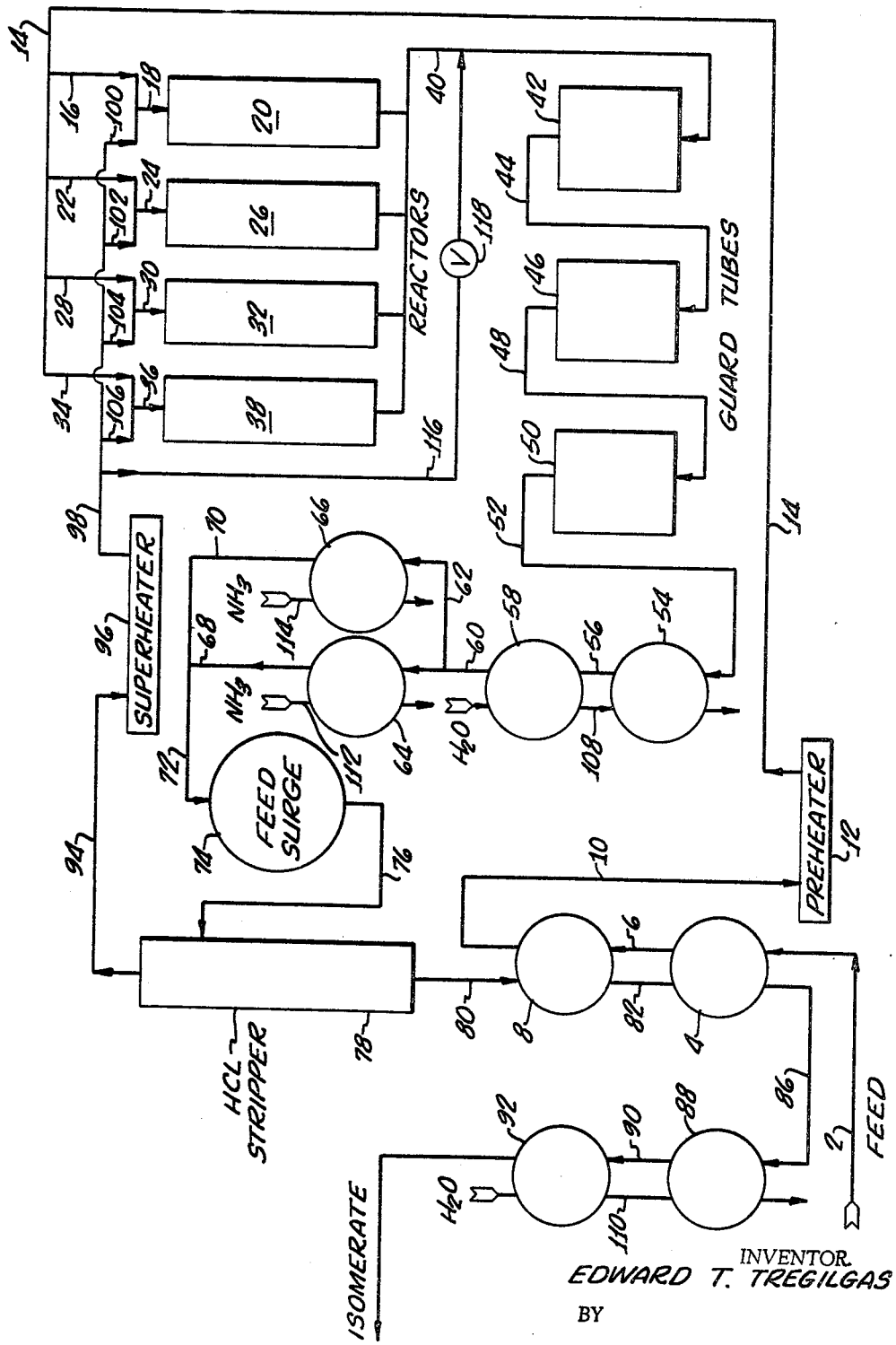

ABSTRACT OF THE DISCLOSURE

A conventional isomerization system which includes two or more parallel isomerization reactors in series with one or more guard tubes is modified to permit injection of measured quantities of HCl into the isomerate line following the reactors and before the guard tubes during the time that one of the reactors is taken out of the system for catalytic recharging to thereby increase the isobutane yield from the system by reason of isomerization occurring in the first of the guard tubes.

BACKGROUND OF THE INVENTION

Field of the invention

This invention relates to a process and system for conducting isomerization reactions. More particularly, this invention relates to a process for improving the isobutane yield from a conventional isomerization system by means of a minor modification thereto.

Description of the prior art

Isomerization of paraffins, generally having from four to eight carbon atoms per molecule, is well known and is of considerable commercial importance, although its commercial importance has diminished recently following the introduction of catalytic hydrocracking processes. It is anticipated, however, that as air pollution control measures become more stringent isomerization may again attain very substantial commercial importance as a means for reducing the volatile components of automobile fuels. Isobutane, produced in the subject process, is a feed stock for alkylation processes for iso-octane production. The iso-octane is blended into aviation and motor fuels.

The isomerization of paraffins is normally effected by such catalysts as activated aluminum chloride or bromide, ferric chloride, or boron fluoride with hydrogen fluoride, in the presence of activators such as hydrogen chloride. The actual catalysts of isomerization are believed to be acid catalysts of the type $HAlCl_4$ or $HBF_4$. Minute amounts of oxygen may have a promoting effect on the isomerization of normal paraffins with aluminum chloride.

The preparation of aluminum chloride isomerization catalysts is described by Ipatieff and Pines in U.S. Patent No. 2,311,232. This process involves the mixing of diatomaceous earth with anhydrous aluminum chloride and a treatment with HCl. Aluminum chloride may, however, be sublimed onto a desired carrier or a solid aluminum chloride catalyst may be used.

Other catalysts, such as those named previously and catalyst mixtures, e.g. $AlCl_3$ and $SbCl_3$, may be used.

The conventional reaction of the prior art is carried out by passing a mixture of the hydrocarbon, commonly normal butane, and a required amount of hydrogen chloride, at a temperature of about 210° F., through a reaction chamber containing the catalyst. Additional isomerization reactors may be required, depending upon the design of the individual reactors. In such cases, it is known to add promotor, such as HCl, to the reaction mixture in or before entering each of the succeeding zones. Such reaction zones are generally arranged such that the weakest catalyst is contacted last and, by reason of the addition of HCl before each reaction zone, the weakest catalyst would contain the highest percentage of promotor. A process generally of this type is described by Warrick and Watson in U.S. Patent No. 2,346,527. A similar process is described by Iverson in U.S. Patent No. 2,404,499.

Following the isomerization reactors, it is conventional to provide a guard chamber or acid scrubber as described by Roberts in U.S. Patent No. 2,436,900. This or an equivalent system is required for recovery of the aluminum chloride catalyst which, being volatile at the operating temperature, is gradually removed from the isomerization reactor. One method of recovering the catalyst is described by Upham in U.S. Patent No. 2,404,551.

Except as pointed out hereinafter, the isomerization units to which the present invention is applicable may be of any of the conventional types of processes and systems described in the foregoing patents and in such standard works as Sachanen, Conversion of Petroleum, Reinhold, 1948 and Cruse and Stevens, Chemical Technology of Petroleum, 3rd Ed., McGraw Hill, New York, 1960 and in the references cited therein.

It is conventional to use two or more parallel isomerization reactors preceding a series of guard tubes. Since the catalyst is gradually spent during operation, one of the isomerization reactors at a time is removed from the system and the catalyst replaced. This, of course, tends to reduce the production of isobutane. It is a principal object of this invention to provide a system and process for reducing the loss of isobutane production during the shutdown of one of a plurality of parallel isomerization reactors.

SUMMARY OF THE INVENTION

It has been found that in a system wherein the combined output of a plurality of parallel isomerization reactors feeds into one or more guard tubes, the loss in isobutane production during the shutdown of one of the isomerization reactors can substantially be reduced by injecting a controlled amount of HCl into the isomerate stream prior to the guard tubes for forming and controlling an isomerization zone in the first of the guard tubes. This isomerization zone results from the carry-over of catalyst from the reactors to the first guard tube coupled with the addition of the promotor to the isomerate stream. It is, accordingly, an object of this invention to increase the yield of isobutane during the shutdown of one of a plurality of parallel isomerization reactors.

A more specific object of the invention is to provide a system and process for supplementing the isomerization process normally carried out in a plurality of parallel isomerization reactors.

A more specific object of the invention is to provide a system and process for injecting promotor into a hydrocarbon stream containing a normal hydrocarbon and an isomerized hydrocarbon for increasing the isobutane yield in an isomerization reaction zone in a guard tube.

Other objects of the invention will appear from the specification and from the drawing to which reference is made.

BRIEF DESCRIPTION OF THE DRAWING

The single figure exemplifies a typical isomerization system using a plurality of isomerization reactors in parallel and a plurality of guard tubes in series.

DESCRIPTION OF THE PREFERRED EMBODIMENT

A conventional isomerization system of which the drawing is typical will be described before considering the improvement which constitutes the present invention.

The feed, usually normal butane, enters the system through a line 2 and is preheated through a first heat exchanger 4 and carried by line 6 to a second series heat exchanger 8. The feed stream is carried through line 10 to a preheater 12 and then to the reaction zone. The feed stream is divided and passes through lines 16 and 18 to reactor 20, lines 22 and 24 to reactor 26, lines 28 and 30 to reactor 32 and through lines 34 and 36 to reactor 38. The feed is also mixed with HCl as will be described hereinafter. The isomerate, actually a mixture of normal butane and isobutane, is removed from the reactors to line 40 where it passes into the first guard tube 42 and then through line 44 to the second guard tube 46 and thence through line 48 to the third guard tube 50. The guard tubes strip the catalyst from the hydrocarbon stream.

The hydrocarbon stream is then carried through line 52 through a first water cooled heat exchanger 54 and then through line 56 to a second water cooled heat exchanger 58 and thence through line 60 and through line 62 to parallel ammonia cooled heat exchangers 64 and 66. Lines 68 and 70 carry the divided hydrocarbon stream to line 72 and thence to a feed surge vessel 74 which communicates through line 76 to an HCl stripper 78. The hydrocarbon fraction of the stream flows through line 80 to the heat exchanger 8 and through line 82 to the heat exchanger 4 where residual heat is transferred to the feed. The isomerate then flows through line 86 to a water cooled heat exchanger 88 and through line 90 to a second series water cooled heat exchanger 92 for further cooling and is carried from the system for stabilizing. The HCl, from the HCl stripper, is recycled through line 94 to a superheater 96 and through line 98 where the stream is split and flows through lines 100, 102, 104 and 106 to the reactors 20, 26, 32 and 38 respectively.

Water is supplied through line 108 to the heat exchangers 54 and 58 and through line 110 to the heat exchangers 88 and 92. Ammonia is supplied through lines 112 and 114 to heat exchangers 64 and 66.

To this point, the isomerization unit is typical of conventional isomerization systems in all respects. There are, of course, variations in the particular layout of the several systems and the embodiment typified by the foregoing is merely exemplary of a conventional isomerization system and it is to be understood that the type of isomerization system, except as specified hereinafter and defined in the claims, is of no consequence insofar as the invention is concerned.

Using the illustrated system as typical, it will be understood that, once steady state operation has been achieved, the catalytic activity within the reactors 20, 26, 32 and 38 will differ depending upon the age of the catalyst in the reactor since recharging. For convenience only, consider the reactors to include catalysts having a diminishing activity from reactor 38 to reactor 20. For example, assume that reactor 38 has the greatest catalytic activity, reactor 32 has a lesser degree of catalytic activity, reactor 26 has less catalytic activity than reactor 32 and reactor 20 has an even greater diminished activity indicating that reactor 20 has been on stream for the greatest period of time and reactor 38 has been on stream for the least period of time since recharge of the catalyst.

Since, for efficient isomerization, a greater amount of promotor is required for a highly spent catalyst, reactor 20 will have the highest concentration of promotor, HCl, and reactor 38 will have the least concentration of promotor. Let it be assumed, for purposes of illustration, that the feed stream entering reactor 38 contains about 3% HCl, the feed stream entering reactor 32 contains about 7% HCl, the feed stream entering reactor 26 contains about 11% HCl and the feed stream entering reactor 20 contains about 15% HCl. Let a typical case be assumed for purposes of illustration wherein it is inefficient to increase the concentration of HCl much above 15% and, when operation becomes inefficient at this level of promotor, the reactor is taken off stream and recharged with catalyst. When this occurs, reactor 20 will be taken off stream, by means of conventional valving systems, thereby reducing the production of isomerate.

It has been found that the isobutane yield is not reduced by the expected 25% but is, normally, reduced by about 30 to 35%.

It has further been discovered that the loss in isobutane yield during the downtime of reactor 20 can substantially be reduced by injecting HCl into the isomerate line to increase the isomerization yield in guard tube 42. This is done by feeding HCl through line 116 and valve 118 from line 98 to line 40.

It will be recognized upon reflection that the greatest contributor of HCl to the system just prior to shutdown of reactor 20 was the stream flowing through reactor 20. About 40% of the HCl in the isomerate stream, in line 40, is contributed by the stream flowing through reactor 20. When reactor 20 is shut down for a recharge of the catalyst, the HCl is greatly diminished and the rate of isomerization production in the guard tube 42 is substantially diminished. By supplementing the HCl in line 40, by means of line 116, the effect of the loss of reactor 20 can very substantially be diminished. It is possible to carry on isomerization reactions during the downtime of reactor 20 with a loss of only 15 to 20 percent of of the yield, rather than a 30 to 35 percent loss.

The present invention, therefore, contemplates a system including means for feeding HCl into an isomerate stream from a plurality of parallel reactors prior to the entry of said stream into a series of guard tubes. The invention also contemplates a process for reducing the loss of isobutane yield during down time of one or more of a plurality of parallel reactors.

It will be apparent from the foregoing discussion that the nature of the catalyst and the precise nature of the isomerization system is of no particular consequence so long as the isomerization system includes at least two and preferably a larger number of parallel reactors feeding through a common line or system to one or more series guard tubes.

The operating conditions for isomerization units are adequately described in the foregoing publications and patents to which reference has been made. The amount of HCl to be added to the isomerate stream can be determined by adding HCl to produce the optimum isomerization conditions, temperature in particular, in the guard tube 42. Typically, HCl equivalent to 12 to 14 percent of the maximum HCl concentration in a single reactor feed stock is injected into line 40. Since each isomerization system has its own operating characteristics, however, optimum values of HCl injection must be determined by measurement of temperature of the guard tube and the isobutane yield as a function of the added HCl. When an optimum temperature and maximum isobutane yield is obtained, further addition of HCl is not beneficial.

Modifications to various types of isomerization units, according to the foregoing teachings, may be made by those skilled in the art and it is contemplated that such modifications as are obvious from the foregoing discussion and from the prior art shall be included within the scope of the invention. It is further contemplated that the scope of the invention shall be limited and defined only by the appended claims.

I claim:

1. In an isomerization system of the type which includes a plurality of parallel isomerization reactors and one or more series guard tubes for receiving the combined output flow of said reactors, the improvement comprising means for injecting isomerization promotor into the input stream to said guard tubes between the parallel reactors and the guard tubes for forming an isomerization zone in the first of said guard tubes.

2. The improvement of claim 1 further comprising means for regulating the rate of promotor injection.

3. In a process for isomerizing hydrocarbons in the range of $C_4$ to $C_8$ which includes the steps of combining the output streams of a plurality of isomerization zones and passing the combined stream through a series of guard tubes, the improvement comprising injecting additional HCl promotor into said combined stream when one or more of said plurality of isomerization zones is shut down for recharge of catalyst.

4. The improvement of claim 3 wherein said additional promotor is approximately equal in quantity to the promotor normally leaving said isomerization zone which has been shut down for recharge of catalyst.

References Cited

UNITED STATES PATENTS

| 2,346,527 | 4/1944 | Warrick et al. | 260—683.67 |
| 2,404,499 | 7/1946 | Iverson | 260—683.74 |
| 3,060,249 | 10/1962 | Wise | 260—683.75 |

DELBERT E. GANTZ, Primary Examiner

G. J. CRASANAKIS, Assistant Examiner

U.S. Cl. X.R.

260—683.75